Sept. 4, 1945.　　　F. G. MANSON ET AL　　　2,384,187
PARACHUTE CANOPY
Filed June 7, 1943
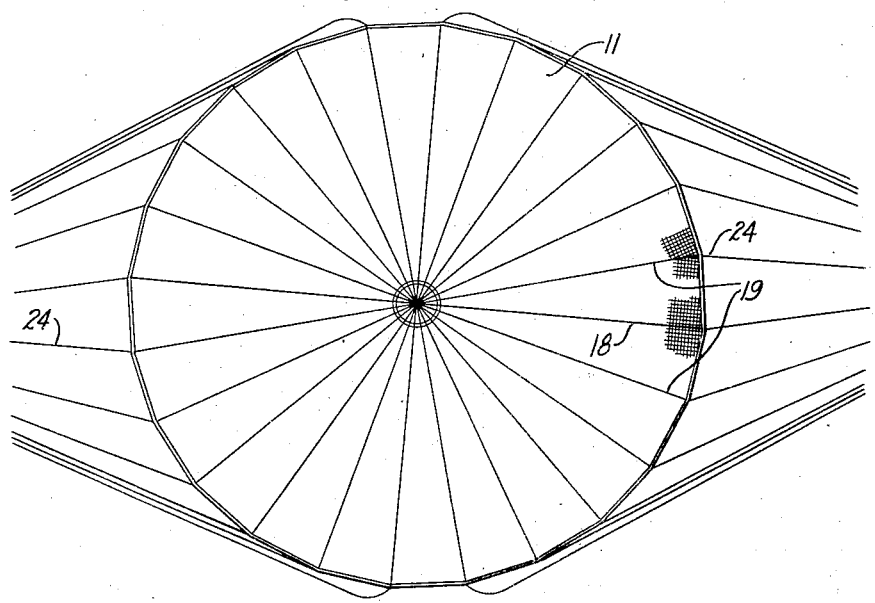
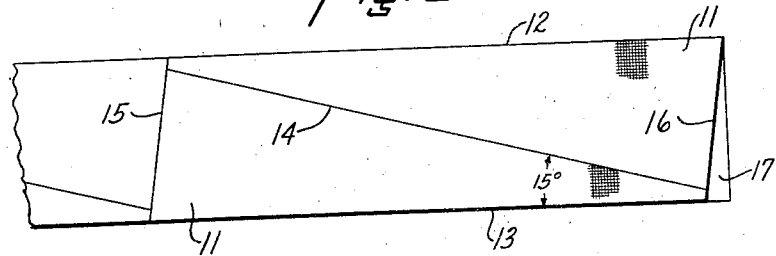
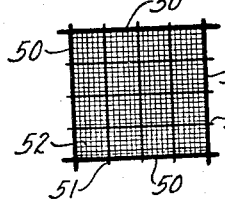 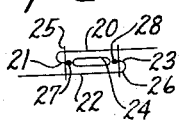 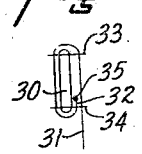 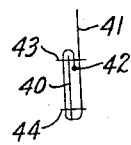
INVENTORS
FRANK G. MANSON
AND JAMES J. MASKEY
BY　Louis A. Kline
THEIR ATTORNEY Patented Sept. 4, 1945

2,384,187

UNITED STATES PATENT OFFICE 2,384,187

PARACHUTE CANOPY

Frank G. Manson and James J. Maskey,
Dayton, Ohio

Application June 7, 1943, Serial No. 489,959

1 Claim. (Cl. 244—145)

This invention relates to a novel parachute canopy and the method of manufacturing such a canopy whereby a light-weight, less bulky canopy can be made, using a smaller amount of fabric than has been used previously to fabricate the same diameter canopy.

In the novel method of manufacturing the novel parachute canopy, the panels from which the canopy is made are cut from fabric in a manner which eliminates much of the waste which occurred when panels were cut according to the conventional manner previously used. The panels are cut from the fabric in the form of single-piece bias-cut panels and have their cut edges sealed or fused to produce edges which are equivalent to selvage edges which will not ravel. By using the novel single-piece bias-cut panels, the usual diagonal section seams previously used in parachute panels can be eliminated and the various main radial and other panel seams can be made lighter, both of which features also reduce the amount of fabric required for the canopy and make for a lighter, less bulky parachute canopy.

A novel fabric from which the panels may be cut is a strong light-weight material having a series of cross mesh heavy threads to provide strength and to serve as "rip stops" which prevent tearing, and having enough light-weight threads for warp and fill between the heavy threads to give the desired porosity to the canopy.

It is, therefore, an object of this invention to provide lighter weight and less bulk than previously were obtained in a canopy of similar diameter.

A further object of the invention is to make a parachute canopy from single-piece bias-cut radial-section panels.

A further object of the invention is to make a parachute canopy from single-piece bias-cut panels having their cut edges sealed to be equivalent to selvage edges to prevent raveling.

Another object of the invention is to provide a novel method of manufacturing parachute canopies by which a lighter, less bulky canopy can be made from a smaller amount of fabric than heretofore.

A further object of the invention is to provide a novel method of manufacturing hemispherical parachute canopies by which the various main radial and other panel seams can be made lighter and diagonal section seams can be eliminated from the panels, whereby lighter-weight, less bulky canopies can be made.

A further object of the invention is to provide a novel light-weight fabric from which panels of parachute canopies can be made.

A further object of the invention is to provide a novel method of cutting panels from fabric which enables the same number of panels to be cut from a smaller amount of fabric with a minimum number of cuts and a minimum amount of waste.

With these and incidental objects in view, the invention includes other novel features, the essential elements of which are set forth in appended claims and a preferred form or embodiment of which is hereinafter described with reference to the drawing which accompanies and forms a part of this specification.

In the drawing:

Fig. 1 is a plan view of a hemispherical parachute canopy, showing the arrangement of the novel panels and showing in particular the direction in which the threads of the material run in the different panels.

Fig. 2 illustrates the novel layout by which panels may be cut from a minimum amount of fabric with a minimum amount of waste.

Fig. 3 illustrates a portion of the novel fabric and shows in particular the arrangement of the cross mesh heavy threads which are used to provide additional strength to the fabric and are also used to form a "rip-stop" construction therein.

Fig. 4 shows the novel construction of a main radial panel seam.

Fig. 5 shows the novel construction by which a strengthening webbing is applied around the central aperture in the canopy.

Fig. 6 shows the novel construction by which a strengthening webbing is applied around the periphery of the canopy.

Description

In the past, parachute canopies have been made from bias-cut panels, but they have been made unnecessarily heavy and bulky because of the manner in which the panels were made, the manner in which the panels were joined to form the canopy, and the weight of the fabric that was necessary in order to obtain the required strength.

When panels were made according to the conventional manner heretofore used, each panel was cut in two pieces, each piece having a selvage edge, and these two pieces were joined together at their selvage edges by a diagonal section seam to form a single panel having bias cuts on all of its edges. Since edges which have been cut on the bias will ravel and are not so strong as selvage edges, it was necessary that a relatively large amount of material be turned back along each of the edges and that all the main radial seams, where the panels were joined together, and the seams where strengthening webbing was applied, be provided with extra rows of stitching to insure that the parachute would not fail due to any seam's pulling apart.

The diagonal-section seams required to join the two pieces to form the panels and the necessity of turning back a relatively large amount of fabric at the seams and using extra stitching at the seams made the canopy undesirably heavy and bulky.

In addition to the above disadvantages, the canopies of the prior art were made of material that had to be comparatively heavy in order that it would have the necessary strength.

Applicants have overcome these disadvantages and have produced a novel and improved lightweight, less bulky canopy by a novel method of manufacture in which the panels are cut in a novel manner so that single-piece, bias-cut panels can be obtained without diagonal section seams; the cut edges of the panels are sealed to make them equivalent to selvage edges and thus require less material to be turned back at the seams and fewer rows of stitching to be used; and a novel fabric is used which employs a "rip-stop" construction or network of heavy threads which prevent tearing and provide additional strength to the fabric without a corresponding addition to its weight.

It is believed that the invention will be more readily understood if it is explained in connection with the fabrication of a specific canopy. The invention, therefore, will be described in connection with the fabrication of a hemispherical canopy which is twenty-four feet in diameter and is made up of twenty-four panels. It is to be understood, however, that the particular canopy to be described herein is merely illustrative and that canopies having different diameters and/or different numbers of panels may be fabricated by the novel method of manufacture without departing from the invention.

The novel canopy, which is made up from twenty-four single-piece bias-cut panels, as 11, is shown in Fig. 1.

These panels, as 11, are cut from fabric according to the novel layout shown in Fig. 2, in which the panels are arranged in pairs and each panel has one of its longer radial edges formed from one of the selvage edges 12 or 13 of the material. The other longer radial edges of the panels are formed by making a single bias cut, as at 14, which is cut at an angle of fifteen degrees with respect to the selvage edges 12 and 13. The inner and outer edges of the panels are formed by making cuts, as at 15 and 16, which extend at right angles to the center lines of the panels. The shaded portions of the panels show diagrammatically the direction in which the threads of the fabric run in relation to the edges of the panels, and show that the resulting panels are bias-cut panels.

The angle which the bias cut 14 makes with the selvage edges depends on the number of panels to be used, and, if some other number than twenty-four were used, this angle could be varied to suit the new requirements. By employing the layout shown in Fig. 2, which uses the entire width of the fabric, the panels can be cut from a smaller amount of fabric than was heretofore possible and with a minimum number of cuts and with less waste. The only portions of fabric which would remain after the panels were cut out would be a small triangular piece 17, which results from the cut 16 when the first pair of panels was cut, and a similar piece which would be left after the last pair of panels was cut. In the case of the twenty-four-foot canopy being described, this method of cutting panels reduces the amount of fabric required from between sixty and sixty-five square yards to between forty-five and fifty square yards.

The cut edges of the panels are sealed or fused by heat, if the fabric is made of a thermoplastic material, and by the application of a suitable sealing compound if the fabric is made of other than a thermoplastic material, and these edges, by being sealed, are made resistant to ravel and are the equivalent of selvage edges.

In the formation of the novel canopy, panels are joined with selvage edge to selvage edge as shown at 18 and with bias-cut edge to bias-cut edge as shown at 19. Accordingly, the bias-cut edges of the panels will be joined at every other seam. The shaded portions of the panels in Fig. 1 show diagrammatically the direction in which the threads run in the various adjacent panels.

Fig. 4 shows the novel manner in which a main radial seam is made. The fabric of one panel, as at 20, is turned under a small amount 21, the fabric of an adjacent panel, as at 22, is turned under a small amount 23, and the suspension cord 24 is placed between the turned-under portions. A single row of stitches, as 25 or 26, on either side of the suspension cord 24, is sewed through the turned-back portion 21 or 23 of one panel and the fabric of the other panel to complete the novel seam. The edges 27 and 28, which are selvage edges or their equivalent sealed cut edges, are strong enough and are sufficiently resistant to ravel that a strong seam can be made with the small amount of material turned under as at 21 and 23 and with a single row of stitching on either side of the suspension line 24 as at 25 and 26. It is obvious from the above that a lighter, less bulky main radial seam is produced when selvage or sealed edges are used than when such seams are produced by the conventional method, in which bias-cut raw edges are used, which require a turn-under that extends past the suspension line and which also require four rows of stitching along each seam to produce a seam which is strong enough and will not pull out in use.

In a similar manner, the strengthening webbing 30 (Fig. 5) about the central aperture of the canopy may be attached to the fabric of the panels shown at 31 with a minimum amount of material turned under at 32 and with but two rows of stitches as at 33 and 34. The use of the sealed cut edge 35 enables the webbing to be securely fastened with but a small turn-under because there is no possibility of the cut edge's raveling. This manner of fastening the webbing about the central aperture requires less material and fewer rows of stitching than were used in the fastening of webbing to the canopy in the conventional method heretofore used, which required that the cut edge of the fabric be turned back the full width of the webbing and also required four rows of stitching to be used.

The peripheral strengthening webbing 40 (Fig. 6) may also be attached to the fabric shown at 41 by using the method explained above, which requires that the sealed cut edge 42 be turned under only a small amount and which requires only two rows of stitches 43 and 44 to produce a light-weight, less bulky, strong fastening of the webbing to the fabric.

Thus it is seen that, by the use of salvage or the equivalent sealed edges for all the edges of the panels, less fabric is required for the panels because less fabric must be turned under at the main radial seams or where the strengthening webbing is fastened to the canopy, and fewer rows of stitches are required at these places. Both of these factors are important in the production of light-weight, less bulky parachute canopies.

Applicants also utilize a novel form of fabric which has the necessary strength but is lighter than fabric heretofore used, and this fabric, together with the novel manner of making main radial seams and fastening webbing to the canopy as explained above, enables an extremely light canopy to be fabricated with a minimum amount of bulk.

Fig. 3 shows a portion of the novel fabric. This fabric may be made of any suitable material and contains a network of primary "rip-stops" 50 made of double, seventy denier thread, which "rip-stops" are spaced one inch apart and run at right angles and also parallel to the selvage edge of the fabric to form a series of one-inch squares. Each of the squares formed by the primary "rip-stops" 50 is divided into squares by secondary "rip-stops" of triple, twenty denier thread 51, which are spaced a quarter of an inch apart, and these squares, formed by the secondary "rip-stop" threads 51, are filled with light-weight threads 52 of twenty denier for warp and fill sufficient to give the desired porosity to the fabric. The network of secondary "rip-stops" tends to limit any tear from extending past the quarter-inch squares formed thereby, but, even if the tear should break through a secondary "rip-stop," it would be stopped by the primary "rip-stop" before the tear could extend much more than an inch. Thus applicants have provided a fabric which is light in weight but which is made strong by the network of primary and secondary "rip-stops."

While all the features of the novel parachute canopy and the novel method of its manufacture given above contribute to the production of a parachute canopy having a minimum of weight and bulk, it is not intended that the invention be limited to the use of all these features together, as various features and their accompanying saving in fabric and reduction in weight and bulk of the canopy may be used separately in the fabrication of parachute canopies without departing from the substance of the invention.

While the particular form of parachute canopy and method of its manufacture herein shown and described are particularly adapted to fulfill the objects primarily stated, it is to be understood that it is not intended to confine the invention to the one form or embodiment herein disclosed, for it is susceptible of embodiment in various forms all coming within the scope of the claim which follows.

What is claimed is:

In the method of manufacturing light-weight, less bulky parachute canopies, the step of cutting single-piece bias-cut panels, each of which panels has a selvage edge for one of its longer radial edges; the step of sealing the cut edges of the panels to form edges which are equivalent to selvage edges and will not ravel; and the step of joining the panels to form a parachute canopy, with selvage edges of adjacent panels being joined to form alternate main radial seams and with sealed edges of adjacent panels being joined to form the remaining main radial seams.

FRANK G. MANSON.
JAMES J. MASKEY.